United States Patent [19]

Radlmann et al.

[11] 3,957,734
[45] May 18, 1976

[54] POLYAMIDE CONCENTRATES CONTAINING SULPHONATE GROUPS

[75] Inventors: Eduard Radlmann; Jürgen Schramm; Günther Nischk, all of Dormagen, Germany

[73] Assignee: Bayer Aktiengesellschaft, Leverkusen, Germany

[22] Filed: Aug. 7, 1974

[21] Appl. No.: 495,427

[30] Foreign Application Priority Data

Aug. 7, 1973  Germany............................ 2339865

[52] U.S. Cl. ............................ 260/78 L; 260/78 R; 260/78 S; 260/78 SC; 264/210 R
[51] Int. Cl.² .................. C08G 69/16; C08G 69/26
[58] Field of Search ................................. 260/78 L

[56] References Cited
UNITED STATES PATENTS

| | | | |
|---|---|---|---|
| 3,184,436 | 5/1965 | Magat ................................ | 260/78 L |
| 3,389,172 | 6/1968 | Burrows et al................. | 260/78 L X |
| 3,389,549 | 6/1968 | David............................ | 260/78 L X |
| 3,454,535 | 7/1969 | Bodesheim et al................ | 260/78 L |
| 3,709,865 | 1/1973 | Lofquist et al................ | 260/78 L X |
| 3,828,009 | 8/1974 | Lofquist............................ | 260/78 L |

*Primary Examiner*—Lucille M. Phynes
*Attorney, Agent, or Firm*—Plumley & Tyner

[57] ABSTRACT

The invention relates to high molecular weight polycaprolactams containing monomeric units of the general formulae (I) and (II):

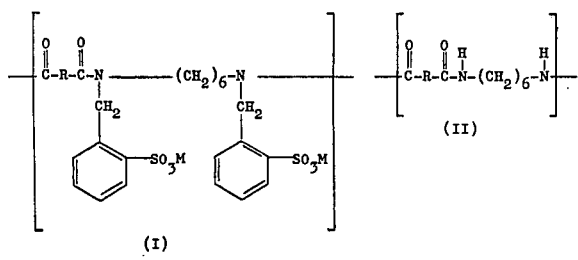

in which:
M is an alkali metal; and
R is an alkylene radical having from 4 to 12 carbon atoms or the radical,

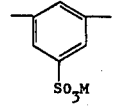

where M is as defined above,
the polymer having a relative solution viscosity of from 1.1 to 3.5 (as measured on solutions of 1 g of polyamide in 100 ml of m-cresol at 25°C) and containing sulphonate groups in a concentration range of from 40 to 2000 mval per kilogram of polymer.

3 Claims, No Drawings

POLYAMIDE CONCENTRATES CONTAINING SULPHONATE GROUPS i. they contain structural elements corresponding to the formulae (I) and (II)

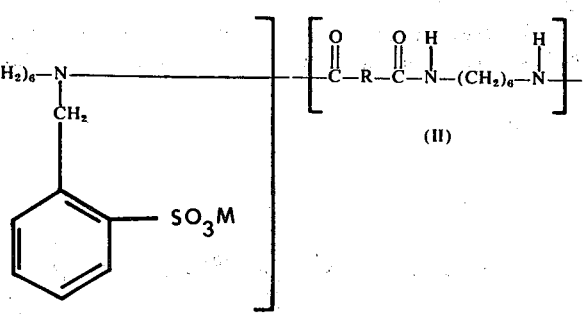

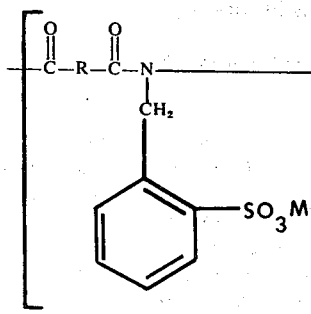

This invention relates to polyamide concentrates containing sulphonate groups and in particular to modified polycaprolactams which can be dyed with basic dyes and processed from the melt to form shaped articles, such as films or fibres.

It is known that nylon-6,6 can be modified by co-condensation with monomers containing sulphonate groups, for example salts of 5-sulphoisophthalic acid or salt of N-sulphoalkylhexamethylene diamine, and that shaped structures of these co-condensates can be dyed with basic dyes, (cf. for example U.S. Pat. Nos. 3,184,436, 3,454,535 or DT-OS No. 1,593,903).

By contrast, nylon-6 cannot be modified in this way because the aforementioned salts of the sulphonates are insoluble in caprolactam, are deposited in polymerisation apparatus and spinning units and do not allow trouble-free production and further processing of the polymer (cf. DT-OS No. 2,215,515, page 1).

Hitherto, all that has been known is that small quantities of a salt of N-sulphobutylhexamethylene diamine and azelaic acid or the dimeric acid of oleic acid are soluble in caprolactam and can be co-condensed (cf. DT-OS No. 2,215,515).

It has now been found that caprolactam can be polycondensed with N,N′-bis-(2-sulphonatobenzyl)-hexamethylene diamine in the form of a bis-alkali metal salt or even in the form of an internal salt with a dicarboxylic acid, for example adipic acid, to form completely homogeneous, fusible polycaprolactams which can contain up to 2000 mval. of sulphonate groups per kilogram. It is surprising that, by using N,N′-bis-(2-sulphonatobenzyl)-hexamethylene diamine, which can readily be obtained by a hitherto unknown process from 2-sulphonatobenzaldehyde and hexamethylene diamine, followed by catalytic hydrogenation, polycaprolactum can be modified with sulphonate groups in wide concentration range to enable it to be dyed with basic dyes, without any of the known production and processing difficulties attributable to insoluble constituents. The polycaprolactams having very high sulphonate concentrations, so-called "concentrates", which can be obtained for the first time in this way, can be added to unmodified polycaprolactam immediately before the shaping or forming process in the particular quantity required to impart dyeability with basic dyes.

Accordingly, the present invention provides new high molecular weight polycaprolactams which are characterised in that in which
M represents an alkali metal; and
R represents an alkylene radical having from 4 to 12 carbon atoms or the radical

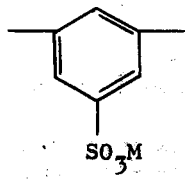

where M is already defined, ii. they have relative solution viscosities of from 1.1 to 3.5 (as measured on solutions of 1 g of polyamide in 100 ml of cresol at 25°C), and iii. they contain sulphonate groups in a concentration range of from 40 to 2000 millival per kilogram of polymer.

These polycaprolactams modified with sulphonate groups can be prepared either a. by polycondensing the bis-alkali metal salt of N,N′-bis-(2-sulphonatobenzyl)-hexamethylene diamine

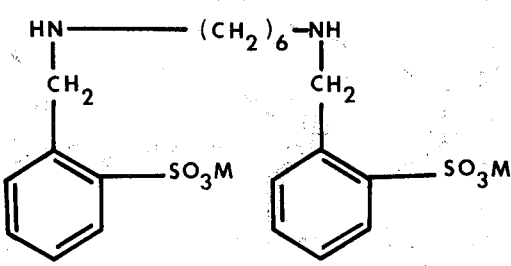

in which
M is as defined above,
with a stoichiometric quantity or, preferably, with an excess of a dicarboxylic acid corresponding to the formula

HOOC—R—COOH in which
R is as defined above,
together with caprolactam and with an equivalent quantity or, preferably, with a deficit of hexamethylene diamine, based on an excess of dicarboxylic acid, in the melt at temperatures in the range of from 100° to 300°C, in the absence of oxygen, in an inert-gas atmosphere and under pressures in the range of from 20 atms to 0.001 Torr; or b. by precondensing the bis-alkali metal salt of the N,N'-bis-(2-sulphonatobenzyl)-hexamethylene diamine

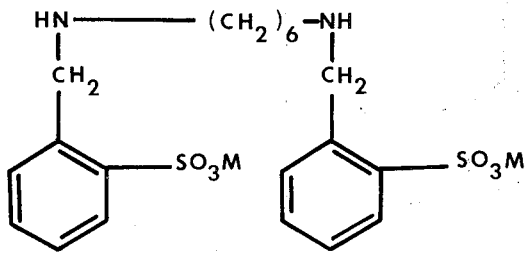

in which
M is as defined above,
optionally in admixture with hexamethylene diamine, in aqueous solution with a dicarboxylic acid ester corresponding to the formula

$R_1—OOC—R—COOR_1$ in which
R is as defined above, and
$R_1$ represents a lower alkyl radical having from 1 to 5 carbon atoms, preferably with an excess in a molar ratio of from 1 : 2 to 1 : 4, in the presence of an inert gas, at normal pressure and at temperatures of up to 100°C, or under pressure at higher temperatures, and adding caprolactam and an equivalent quantity, or even a deficit, of hexamethylene diamine, based on an excess of dicarboxylic acid, to the precondensate thus formed, distilling off the water at temperatures in the range of from 100° to 140°C and polycondensing the mixture in the melt at temperatures in the range of from 100° to 300°C, in the absence of oxygen, in an inert-gas atmosphere and under pressures of from 20 atms to 0.001 Torr; or c. polycondensing the internal salt of N,N'-bis-(2-sulphonatobenzyl)-hexamethylene diamine

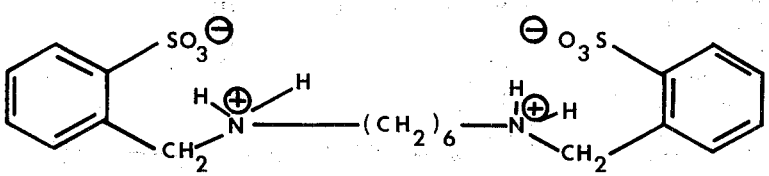

with an equivalent quantity of a bis-alkali metal adipate

$MOOC—(CH_2)_4—COOM$ in which
M is as defined above,
and optionally with another dicarboxylic acid or dicarboxylic acid ester of the formula

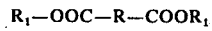
$R_1—OOC—R—COOR_1$ in which
R and $R_1$ are as defined above,
and the stoichiometric quantity of hexamethylene diamine, optionally even a deficit, together with caprolactam in the melt in the same way as described in (a); or d. by converting the inner salt in aqueous dispersion with an excess of hexamethylene diamine into a soluble salt in the presence of an inert gas, in the absence of pressure and at temperatures of up to 100°C, or under pressure at higher temperatures, adding to the resulting aqueous solution caprolactam, alkali metal adipate in a quantity based on the inner salt and a dicarboxylic acid or dicarboxylic acid ester or dicarboxylic acid or dicarboxylic acid ester mixture of the formula

$R_1—OOC—R—COOR_1$ in which
R and $R_1$ are as defined above,
in an equivalent quantity or, preferably in an excess, based on the hexamethylene diamine, distilling off the water at temperatures in the range of from 100° to 140°C and polycondensing the mixture in the melt in the same way as described in (a).

The disodium salt is preferably used as the alkali metal salt of N,N'-bis-(2-sulphonatobenzyl)-hexamethylene diamine.

The alkali metal salts and the internal salts are prepared by reacting 2-sulphonatobenzaldehyde with hexamethylene diamine in stoichiometrically equivalent quantities, preferably with an excess of 2-sulphonatobenzaldehyde, either in a dispersion, such as, for example, in benzene or toluene, or preferably in solution, such as, for example, in N-methylpyrrolidone, methanol or water, in the presence of a condensation catalyst, for example acetic acid, to form the Schiff's base which is then catalytically hydrogenated using a hydrogenation catalyst, for example Raney nickel, and hydrogen (even without previous isolation where condensation is carried out in solution), to form N,N'-bis-(2-sulphonatobenzyl)-hexamethylene diamine:

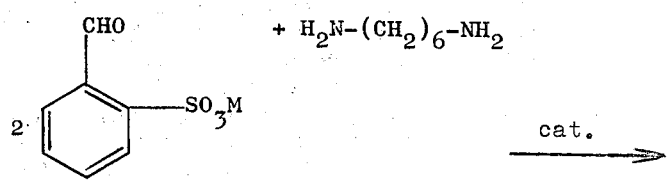

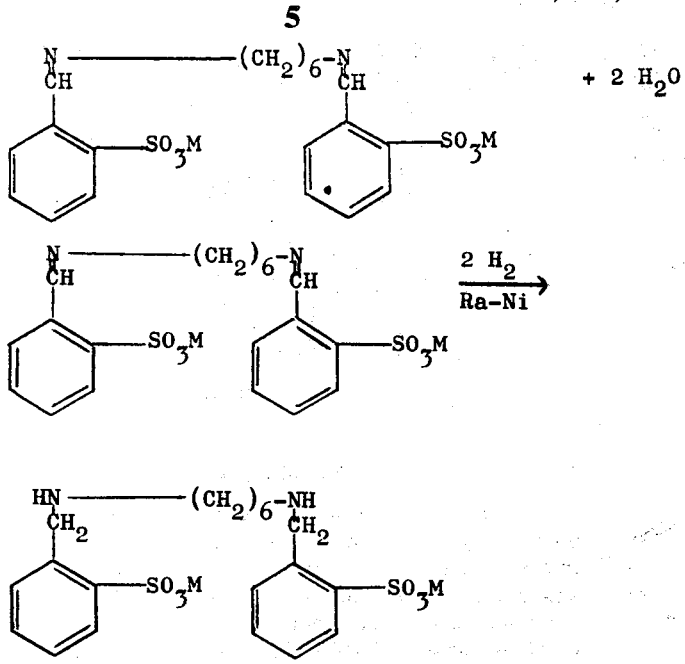

The internal salt can be isolated by acidifying an aqueous or methanolic hydrogenation solution, because it is substantially insoluble in these solvents. By adding a base, the internal salt can be converted back into the external salt form. The yields obtained over both stages are in the range of from 85 to 97%.

The N,N'-bis-(2-sulphonatobenzyl)-hexamethylene diamine or its internal salt are used in such quantities, optionally together with a dicarboxylic acid containing sulphonato groups, for example 5-sulphonatoisophthalic acid, that the concentration of sulphonate groups in the polycaprolactams according to the invention is in the range of from 40 to 2000 mval and preferably from 80 to 1500 mval per 1000 g of polymer.

If the polycaprolactams according to the invention obtained by the process described in (a) to (b) are directly introduced at the spinning stage, the ratio of amine to carboxyl groups is increased slightly beyond equivalence in favour of the carboxyl groups, in order to obtain adequate reservation with respect to acid dyes. Accordingly, the excess of dicarboxylic acid can be in the range up to 3 mol %.

In order to provide an already full condensed, unmodified polycaprolactam with an affinity for basic dyes, a modified polycaprolactam according to the invention can be added in specific quantities to the unmodified polycaprolactam just before the spinning operation, i.e. before the mixture reaches the spinneret. Where this procedure is adopted, it is best to use a polycaprolactam having a high sulphonate concentration, a so-called "concentrate", in order to keep the quantities to be added as small as possible. It is also favourable, in the interests of reservation with respect to acid dyes, to use an excess of up to 10 mol % of dicarboxylic acid for polycondensation. In this way, the property spectrum of the original polyamide is only slightly modified. In this way, it is readily possible to extrude concentrates containing up to 2000 mval of sulphonate groups per 1000 g of polymer into homogeneous, granulatable strands which are particularly convenient to introduce. The end products are filaments and fibres which have an excellent affinity for basic dyes and a good reservation with respect to acid dyes.

The relative solution viscosities $\eta$ rel. quoted in the following Examples were measured at 25°C on solutions of 1 g of material in 100 ml m-cresol.

The parts by weight used in the Examples are to parts by volume as kilograms to litres.

The following Examples are to further illustrate the invention without limiting it.

EXAMPLE 1

Preparation of the disodium salt of N,N'-bis-(2-sulphonatobenzyl)-hexamethylene diamine

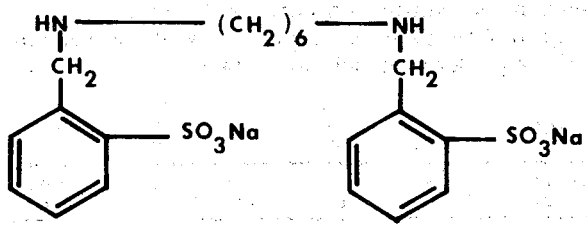

a. In a reaction vessel equipped with a water separator, a mixture of 208.0 parts by weight of the sodium salt of 2-sulphonatobenzaldehyde, 58.0 parts by weight of hexamethylene diamine, 2.5 parts by weight of acetic acid and 900 parts by volume of toluene, is heated with stirring for 8 hours until no more water is azeotropically separated off. The pure white deposit is filtered under suction, washed with toluene and dried in vacuo at 80°C.

Yield: 247.5 parts by weight (=99.7% of the theoretical), m.p.: 190°–206°C.

b. 247.5 parts by weight of the bis-Schiff's base prepared in accordance with (a) are dissolved in 2000 parts by volume of methanol, 30 parts by weight of Raney nickel "B" are added and the mixture is hydrogenated for 3.5 hours in a hydrogenation autoclave at a temperature of 112°C and under a hydrogen pressure of 100 atms. The solution is filtered off from the catalyst and concentrated to dryness.

Yield: 235.3 parts by weight (=94.3% of the theoretical), m.p.: 140°–146°C.

| Analysis | C % | H % | O % | N % | S % | Na % |
|---|---|---|---|---|---|---|
| calculated: | 48.0 | 5.2 | 19.2 | 5.6 | 12.8 | 9.2 |
| found: | 47.8 | 5.1 | 19.2 | 5.2 | 12.1 | 8.8 |

EXAMPLE 2

Preparation of the internal salt of N,N'-bis-(2-sulphonatobenzyl)-hexamethylene diamine

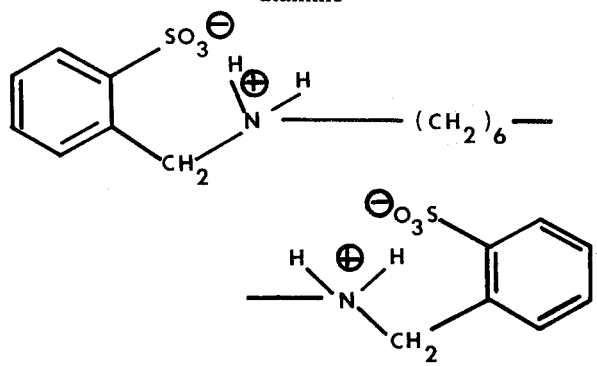

A solution of 1160 parts by weight of hexamethylene diamine, 4576 parts by weight of the sodium salt of 2-sulphonatobenzaldehyde and 50 parts by weight of glacial acetic acid in 12,000 parts by weight of water, is heated under reflux for 3 hours in a reaction vessel equipped with a stirrer and reflux condenser. The solution is then hydrogenated for 2.5 hours at 75°C under a hydrogen pressure of 60 atms in a hydrogenation autoclave to which 100 parts by weight of Raney nickel B are added. After the hydrogenation catalyst has been separated off, the aqueous solution is acidified with hydrochloric acid. The deposit formed is filtered under suction and washed with water until neutral.

Yield: 4031 parts by weight (88.4% of the theoretical). m.p.: does not melt up to 300°C

| Analysis | C % | H % | O % | N % | S % |
|---|---|---|---|---|---|
| calculated: | 52.6 | 6.1 | 21.1 | 6.1 | 14.0 |
| found: | 52.2 | 6.3 | 21.8 | 6.3 | 13.8 |

EXAMPLE 3

In a polycondensation apparatus, a mixture of 47,650 parts by weight of ε-caprolactam, 1310 parts by weight of ε-aminocaproic acid, 912 parts by weight of the internal salt of N,N'-bis-(2-sulphonatobenzyl)-hexamethylene diamine, 380 parts by weight of sodium adipate and 50 parts by weight of phosphorous acid, is heated for 2.5 hours to 270° while nitrogen is passed over, and is condensed with stirring for 4 hours. The highly viscous melt is spun through a water bath into strands which are granulated. The granulate is extracted with water at 80°C and dried in a tumbler dryer at 100°C. After this treatment, the polymer has the following properties:

Melt viscosity (at 260°C): 3620 poises
Melt viscosity (at 280°C): 2140 poises
Relative viscosity η rel. = 2.735
Water content = 0.040%
Softening point = 221°C
Sulphur content = 80 mval of sulphonate groups/kg of polymer.

Filaments produced from this polyamide can be dyed to form deep colours with basic dyes, for example:

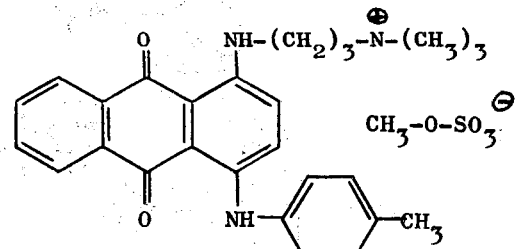

EXAMPLE 4

In a polycondensation apparatus, a mixture of 4000 parts by weight of water, 1140 parts by weight of the internal salt of N,N'-bis-(2-sulphonatobenzyl)-hexamethylene diamine and 435 parts by weight of hexamethylene diamine, is reacted with stirring for a period of 2 hours at 100°C while nitrogen is passed over. 2605 parts by weight of ε-caprolactam, 475 parts by weight of disodium adipate, 570 parts by weight of adipic acid and 5 parts by weight of phosphorous acid, are then added at around 80°C. The solution is then heated with stirring to 200°C with the vessel closed. After venting, the temperature is increased to 275°C. After stirring for 1.5 hours in the presence of nitrogen under these conditions, the pressure is gradually reduced to 15 Torr over a period of 2 hours, followed by condensation for a further 2 hours. The highly viscous melt is then extruded and the strands are passed over a drying belt and subsequently granulated. The homogenous, colourless concentrate has the following properties:

Melt viscosity (at 260°C): 1165 poises
Melt viscosity (at 240°C): 2250 poises
Relative viscosity η rel. = 1.94
Water content: 0.037%
Softening range: 165°–172°C
Sulphur content = 1015 mval of sulphonate groups/kg of polymer.

The addition of 8% by weight of this concentrate to an unmodified nylon-6 before spinning ultimately results in the formation of filaments which can be dyed to deep colours with basic dyes, for example with a dye corresponding to the formula:

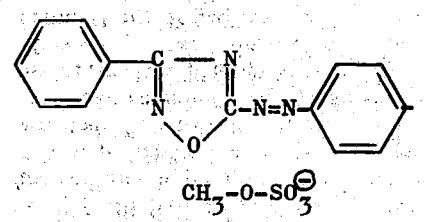

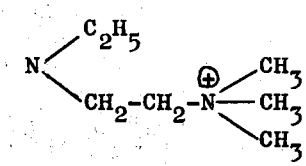

These filaments also show good reservation with respect to acid dyes.

EXAMPLE 5

In a polycondensation apparatus, 1776 parts by weight of the sodium salt of 5-sulphoisophthalic acid dimethyl ester, 1114 parts by weight of hexamethylene diamine and 1200 parts by weight of the disodium salt of N,N'-bis-(2-sulphonatobenzyl)-hexamethylene diamine, are heated under reflux for 2 hours in 10,000 parts by weight of water while nitrogen is passed over. On completion of precondensation, 1272 parts by weight of sebacic acid, 5239 parts by weight of caprolactam and 10 parts by weight of phosphorous acid are added to the solution, and the closed vessel is heated to 200°C so that the internal pressure amounts to 16 atms. After 1 hour under these conditions, the vessel is vented over a period of 3 to 5 hours. It is then flushed with nitrogen, the temperature is increased to 270°C and the pressure is gradually reduced to 5 Torr. After 8 hours under these conditions, condensation is terminated, the viscous melt is extruded and the strands are passed over a drying belt and granulated by a following granulator. The homogeneous colourless concentrate has the following properties:

Melt viscosity (at 260°C): 1423 poises
Melt viscosity (at 240°C): 2644 poises
Relative viscosity $\eta$ rel. = 2.04
Water content: 0.051%
Softening range: 162°–169°C
Sulphur content: 1085 mval of sulphonate groups per kg of polymer.

If 7% by weight of a concentrate of this kind are added to an unmodified nylon-6 shortly before spinning, the filaments obtained and the articles produced from them can be dyed to deep colours with basic dyes, for example:

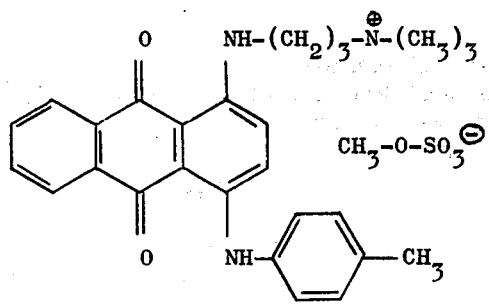

The filaments moreover show good reservation with respect to acid dyes.

EXAMPLE 6

In a polycondensation apparatus, 3420 parts by weight of the inner salt of N,N'-bis-(2-sulphonatobenzyl)-hexamethylene diamine and 1305 parts by weight of hexamethylene diamine are heated under nitrogen while stirring to 100°C in 10,000 parts by weight of water until a clear solution is formed. 1708 parts by weight of adipic acid, 1425 parts by weight of disodium adipate, 2817 parts by weight of caprolactam and 10 parts by weight of phosphorous acid, are then added to the solution. By heating to 140°C, the water is removed by distillation. The temperature is then gradually increased to 275°C. Condensation is continued for 3 hours under these conditions, after which the pressure is gradually reduced to 15 Torr and condensation is completed over a period of a further 4 hours. The clear, colourless melt is granulated as described in Example 5. The concentrate shows the following properties:

Melt viscosity (at 260°C): 1244 poises
Melt viscosity (at 240°C): 2851 poises
Relative viscosity $\eta$ rel. = 1.79
Water content: 0.032%
Softening range: 191°–198°C
Sulphur content: 1496 mval of sulphonate groups per kg of polymer.

The addition of 6% by weight of this concentrate to an unmodified nylon-6 leads after spinning to filaments which can be dyed to deep colours with basic dyes, as described in Examples 3, 4 and 5, and which show good reservation with respect to acid dyes.

EXAMPLE 7

In a condensation apparatus, 456.0 parts by weight of the internal salt of N,N'-bis-(2-sulphonatobenzyl)-hexamethylene diamine and 174.0 parts by weight of hexamethylene diamine are heated under nitrogen with stirring to 100°C in 1000 parts by weight of water until a clear solution is formed. 22.8 parts by weight of adipic acid, 190.0 parts by weight of disodium adipate, 50.1 parts by weight of caprolactam and 10 parts by weight of phosphorous acid are then added, the water removed by distillation and the temperature is increased to 280°C. Condensation is carried out at a temperature of 280°C over a period of 2.5 hours under normal pressure and over a period of 4 hours at 15 Torr. A clear, homogeneous, colourless viscous melt is obtained, and is subsequently granulated in the same way as described in Example 5. The concentrate has the following properties:

Melt viscosity (at 260°C): 2015 poises
Melt viscosity (at 240°C): 2965 poises
Relative viscosity $\eta$ rel. = 2.33
Water content: 0.061%
Softening range: 195°–204°C
Sulphur content: 1996 mval of sulphonate groups per kg of polymer.

If only 4% by weight of this concentrate are added to an unmodified nylon-6 before spinning, the filaments obtained can be dyed to deep colours with basic dyes whilst at the same time they show good reservation with respect to acid dyes.

What we claim is:

1. High molecular weight polycaprolactams containing structural elements of the general formulae (I), (II) and (III)

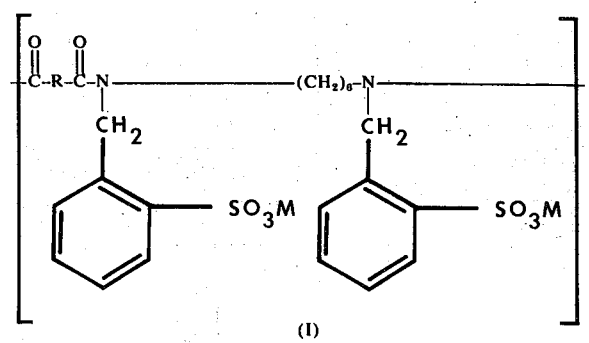

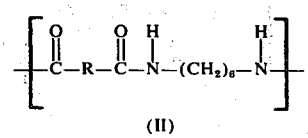

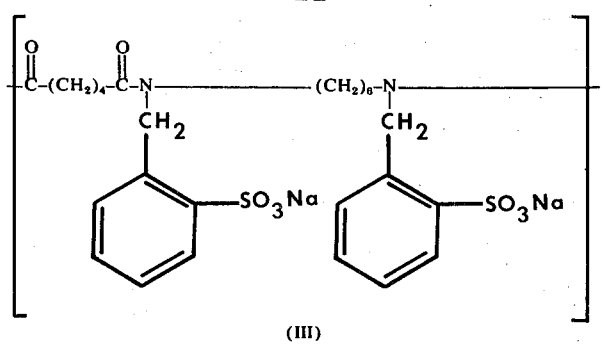

(III)

in which:
 M is an alkali metal; and
 R is an alkylene radical having from 4 to 12 carbon atoms or the radical,

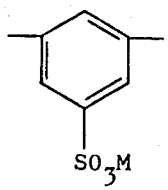

where M is as defined above,
the polycaprolactams having relative solution viscosities of from 1.1 to 3.5 (as measured on solutions of 1 g of polyamide in 100 ml of m-cresol at 25°C) and containing sulphonate groups in a concentration range of from 40 to 2000 mval per kilogram of polymer.

2. High molecular weight pollycaprolactams containing structural elements of the general formulae (I), (II), (III) and (V)

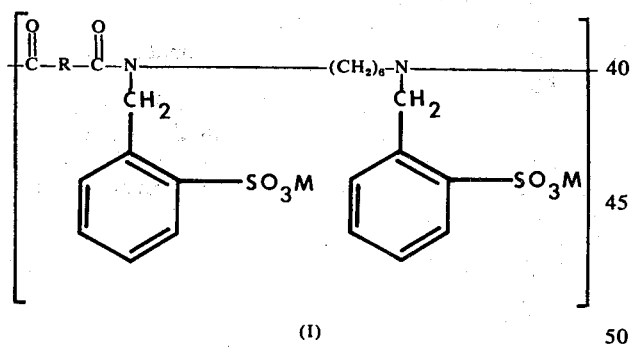

(I)

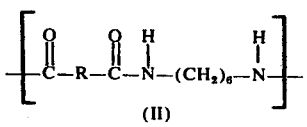

(II)

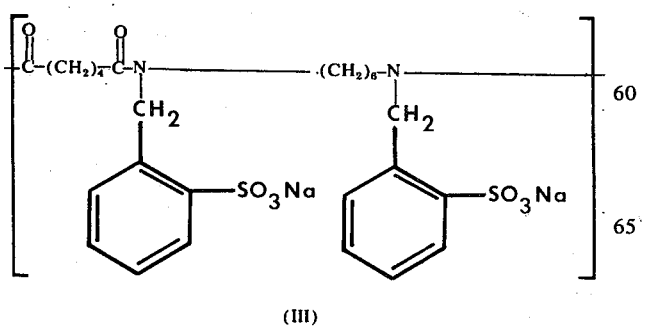

(III)

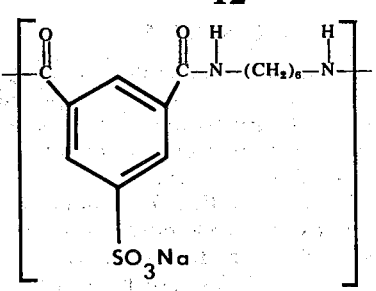

(V)

having relative solution viscosities of from 1.1 to 3.5 (as measured on solutions of 1 g of polyamide in 100 ml of m-cresol at 25°C) and containing sulphonate groups in a concentration range of from 40 to 2000 mval per kilogram of polymer.

3. A process for the production of homogeneous polycaprolactams containing structural elements of the general formulae (I) and (II):

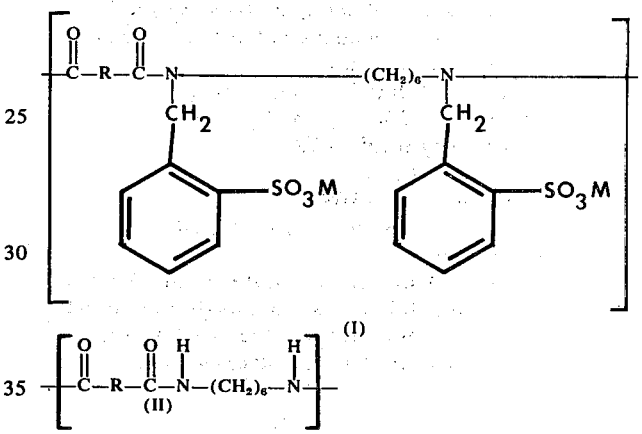

in which
 M is an alkali metal; and
 R is an alkylene radical having from 4 to 12 carbon atoms or the radical

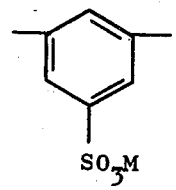

where M is as defined above,
 wherein either
  a. the bis-alkali metal salt of N,N'-bis-(2-sulphonatobenzyl)-hexamethylene diamine

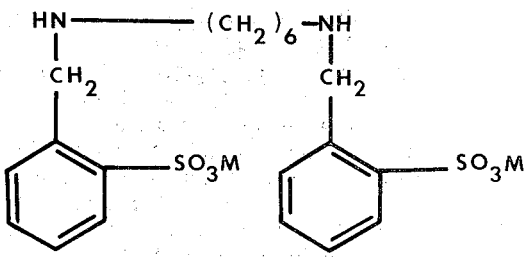

in which

M is as defined above, is polycondensed with the stoichiometric quantity, or preferably with an excess, of a dicarboxylic acid corresponding to the formula

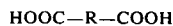

HOOC—R—COOH in which

R is as defined above, and caprolactam and, otpionally, an equivalent quantity or, preferably, a deficit of hexamethylene diamine, based on an excess of dicarboxylic acid, in the melt at temperatures in the range of from 100° to 300°C, in the absence of oxygen, in an inert gas atmosphere and under pressures of from 20 atms to 0.0001 Torr; or b. The bis-alkali metal salt of N,N'-bis-(2-sulphonatobenzyl)-hexamethylene diamine

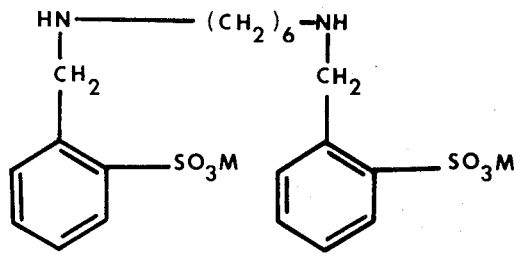

in which

M is as defined above, is precondensed in aqueous solution with a dicarboxylic acid ester corresponding to the formula

R₁—OOC—R—COOR₁ in which

R is as defined above

R₁ represents a lower alkyl radical having from 1 to 5 carbon atoms, preferably an excess in a molar ratio of from 1 : 2 to 1 : 4, in the presence of an inert gas, in the absence of pressure at temperatures of up to 100°C or under pressure at higher temperatures, and caprolactam and, optionally, an equivalent quantity or even a deficit of hexamethylene diamine, based on an excess of dicarboxylic acid, is added to the precondensate thus obtained, the water is distilled off at temperatures in the range of from 100° to 140°C and the mixture is polycondensed in the melt at temperatures of from 100° to 300°C, in the absence of oxygen, in an inert gas atmosphere and under pressures of from 20 atms to 0.001 Torr; or c. the internal salt of N,N'-bis-(2-sulphonatobenzyl)-hexamethylene diamine

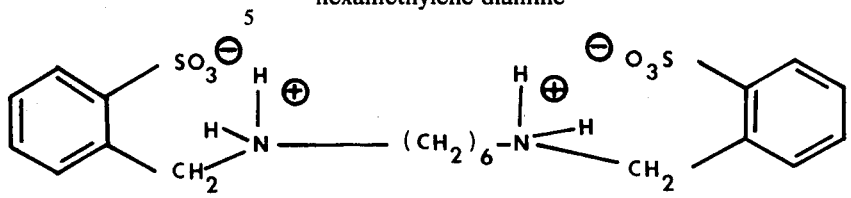

is polycondensed either with the equivalent quantity of a bis-alkali metal adipate

MOOC—(CH₂)₄COOM in which

M is as defined above, and optionally with another dicarboxylic acid or dicarboxylic acid ester of the formula

R₁—OOC—R—COOR₁ in which

R and R₁ are as defined above, and with the stoichiometric quantity of hexamethylene diamine, optionally even a deficit, together with caprolactam, in the melt in the same way as described in (a); or d. the internal salt in aqueous dispersion is converted with an excess of hexamethylene diamine in the presence of an inert gas in the absence of pressure at temperatures of up to 100°C or under pressure at higher temperatures, into a soluble salt, and the aqueous solution obtained has added to it caprolactam, alkali metal adipate in a quantity based on the internal salt and a dicarboxylic acid or dicarboxylic acid ester or dicarboxylic acid or dicarboxylic acid ester mixture of the formula

R₁—OOC—R—COOR₁ in which

R and R₁ are as defined above, in an equivalent quantity or, preferably, even in an excess, based on the hexamethylene diamine, the water is distilled off at temperatures of from 100° to 140°C and the mixture is polycondensed in the melt in the same way as described in (a).

* * * * *